United States Patent
Hotta et al.

(10) Patent No.: US 10,107,167 B2
(45) Date of Patent: Oct. 23, 2018

(54) EXHAUST-HEAT RECOVERY APPARATUS (75) Inventors: Takashi Hotta, Susono (JP); Kenichi Yamada, Yaizu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 76 days.

(21) Appl. No.: 14/403,645

(22) PCT Filed: May 31, 2012

(86) PCT No.: PCT/JP2012/064208
§ 371 (c)(1),
(2), (4) Date: Nov. 25, 2014

(87) PCT Pub. No.: WO2013/179466
PCT Pub. Date: Dec. 5, 2013

(65) Prior Publication Data
US 2015/0176464 A1 Jun. 25, 2015

(51) Int. Cl.
*F01P 7/16* (2006.01)
*F01N 5/02* (2006.01)
(Continued)

(52) U.S. Cl.
CPC .............. *F01N 5/02* (2013.01); *F01N 11/002* (2013.01); *F01N 13/009* (2014.06); *F02G 5/02* (2013.01);
(Continued)

(58) Field of Classification Search
CPC .... F01P 2060/08; F01P 2025/62; F01P 7/167; F01P 7/16
(Continued)

(56) References Cited

U.S. PATENT DOCUMENTS 5,241,926 A * 9/1993 Sato ................. F01P 11/028
123/41.29
2004/0188533 A1* 9/2004 Ito ................. B60H 1/00492
237/44
(Continued)

FOREIGN PATENT DOCUMENTS

DE 102010031561 A1 1/2012
JP 2007-270661 A 10/2007
(Continued)

*Primary Examiner* — Jacob Amick
*Assistant Examiner* — Charles Brauch
(74) *Attorney, Agent, or Firm* — Hunton Andrews Kurth LLP (57) ABSTRACT

An exhaust-heat recovery apparatus includes: a circulation passage, through which a heat carrier circulates, that has a heat recovery unit evaporating the heat carrier and a condenser condensing the evaporated heat carrier; a heat carrier controller that supplies the heat carrier in a liquid phase to the circulation passage; and a determination unit, in which the heat carrier controller supplies or recovers the heat carrier when a changing rate of an internal pressure in the circulation passage or a changing rate of a temperature of the heat carrier in the circulation passage is within a predetermined range, determines a type of abnormality based on the changing rate of the internal pressure in the circulation passage or the changing rate of the temperature of the heat carrier in the circulation passage after the supplying or the recovering of the heat carrier.

7 Claims, 8 Drawing Sheets (51) Int. Cl.
  *F02G 5/02*   (2006.01)
  *F01N 13/00*  (2010.01)
  *F01N 11/00*  (2006.01)
  *F01P 7/14*   (2006.01)
  *F28D 21/00*  (2006.01)

(52) U.S. Cl.
  CPC ............... *F01P 7/16* (2013.01); *F01P 7/167* (2013.01); *F01P 2007/146* (2013.01); *F01P 2025/62* (2013.01); *F01P 2060/08* (2013.01); *F28D 21/0003* (2013.01); *Y02T 10/16* (2013.01); *Y02T 10/166* (2013.01)

(58) Field of Classification Search
  USPC ....................................................... 123/41.1
  See application file for complete search history.

(56) References Cited

U.S. PATENT DOCUMENTS

| | | | |
|---|---|---|---|
| 2010/0031646 A1 | 2/2010 | Iwase et al. | |
| 2011/0023514 A1* | 2/2011 | Mitra | F25B 1/10 62/222 |
| 2011/0041505 A1* | 2/2011 | Kasuya | F01K 23/065 60/660 |
| 2011/0116958 A1* | 5/2011 | Pekrul | F01C 1/3445 418/1 |
| 2016/0153317 A1 | 6/2016 | Geskes et al. | |

FOREIGN PATENT DOCUMENTS

| | | |
|---|---|---|
| JP | 2008-255945 A | 10/2008 |
| JP | 2009-127435 A | 6/2009 |
| JP | 2010-038124 A | 2/2010 |

* cited by examiner

EXHAUST-HEAT RECOVERY APPARATUS

CROSS REFERENCE TO RELATED APPLICATION

This is a national phase application based on the PCT International Patent Application No. PCT/JP2012/064208 filed May, 31, 2012, the entire contents of which are incorporated herein reference.

TECHNICAL FIELD

The present invention relates to an exhaust-heat recovery apparatus.

BACKGROUND ART

An exhaust-heat recovery apparatus recovering heat of exhaust gas of an internal combustion engine is used. For example, exhaust gas evaporates heat carrier such as $H_2O$. And, steam generated by the evaporation is used for warming-up. The steam used for the warming-up is condensed and is circulated in a passage. For example, Patent Document 1 discloses a technology in which it is determined as abnormal when a temperature does not increase within a predetermined time. Patent Document 2 discloses a technology in which abnormality of a valve in a circulation passage is detected based on thermal amount conducted to coolant water from an exhaust-heat recovery apparatus. Patent Document 3 discloses a technology in which abnormality of a thermostat is determined based on a temperature of coolant water after termination of starting of an internal combustion engine.

PRIOR ART DOCUMENTS

Patent Documents

Patent Document 1: Japanese Patent Application Publication No. 2008-255945
Patent Document 2: Japanese Patent Application Publication No. 2010-38124
Patent Document 3: Japanese Patent Application Publication No. 2007-270661

SUMMARY OF THE INVENTION

Problems to be Solved by the Invention

A conventional determination control is a passive control in which abnormality is determined after termination of an operation such as warming-up. With the technology, it is difficult to increase frequency of the determination. In view of the problem, the preset invention has an object to provide an exhaust-heat recovery apparatus that is capable of determining normal/abnormal more often.

Means for Solving the Problems

The present invention is an exhaust-heat recovery apparatus includes: a heat carrier passage, through which a heat carrier circulates, that has an evaporation unit evaporating the heat carrier and a condenser condensing the evaporated heat carrier; a heat carrier controller that changes an amount of the heat carrier in the heat carrier passage and supplies or recovers the heat carrier when a changing rate of an internal pressure of the heat carrier passage or a changing rate of a temperature of the heat carrier in the heat carrier passage is within a predetermined range; and a determination unit that determines whether the heat carrier passage is abnormal based on the changing rate of the internal pressure or the changing rate of the temperature after the supplying or the recovering of the heat carrier.

In the above structure, the heat carrier controller may have a reservoir that reserves the heat carrier in a liquid phase; the heat carrier controller may supply the heat carrier in the liquid phase into the heat carrier passage either when the internal pressure is equal to a pressure applied to the heat carrier in the liquid phase in the reservoir or less and the changing rate of the internal pressure is within the predetermined range or when the temperature is equal to a boiling point of the heat carrier or less and the changing rate of the temperature is within the predetermined value; and the determination unit may determine whether the heat carrier passage is abnormal based on the changing rate of the internal pressure or the changing rate of the temperature after the supplying of the heat carrier.

In the above structure, the determination unit may determine that the heat carrier passage is normal when the changing rate of the internal pressure or the changing rate of the temperature after the supplying of the heat carrier is less than a first value; and the determination unit may determine that the heat carrier passage is abnormal when the changing rate of the internal pressure or the changing rate of the temperature after the supplying of the heat carrier is equal to or more than the first value.

In the above structure, the determination unit may determine that the heat carrier does not exist in the heat carrier passage when the changing rate of the internal pressure or the changing rate of the temperature after the supplying of the heat carrier is equal to or more than a second value that is larger than the first value; and the determination unit may determine that the heat carrier passage lacks of the heat carrier when the changing rate of the internal pressure or the changing rate of the temperature after the supplying of the heat carrier is less than the second value and is equal to or more than the first value.

In the above structure, the determination unit may determine that the heat carrier passage is normal when the changing rate of the internal pressure or the changing rate of the temperature after the supplying of the heat carrier is less than the first value and is equal to or more than a third value that is smaller than the first value; and the determination unit may determine that the heat carrier passage is closed when the changing rate of the internal pressure or the changing rate of the temperature after the supplying of the heat carrier is less than the third value.

In the above structure, the determination unit may determine that the heat carrier passage is normal when the changing rate of the internal pressure or the changing rate of the temperature after the supplying of the heat carrier is less than a fourth value that is smaller than the third value; and the determination unit may determine that the heat carrier passage is closed when the changing rate of the internal pressure or the changing rate of the temperature after the supplying of the heat carrier is less than the third value and is equal to or more than the fourth value.

In the above structure, the heat carrier controller may have a reservoir that reserves the heat carrier in a liquid phase; the heat carrier controller may recover the heat carrier from the heat carrier passage either when the internal pressure is larger than a pressure applied to the heat carrier in the liquid phase in the reservoir and the changing rate of the internal pressure is within a predetermined range or when the temperature is higher than a boiling point of the heat carrier and the changing rate of the temperature is within a predetermined range; the determination unit may determine that the heat carrier passage is normal when the internal pressure or the temperature is reduced after the recovering of the heat carrier; and the determination unit may determine that the heat carrier passage is closed or an amount of the heat carrier is excessive when the internal pressure or the temperature is not reduced after the recovering of the heat carrier.

Effects of the Invention

According to the present invention, it is possible to provide an exhaust-heat recovery apparatus that is capable of performing a determination of normal/abnormal more often.

MODES FOR CARRYING OUT THE INVENTION

A description will be given of embodiments of the present invention with reference to drawings.
[First Embodiment]

Figure 1:
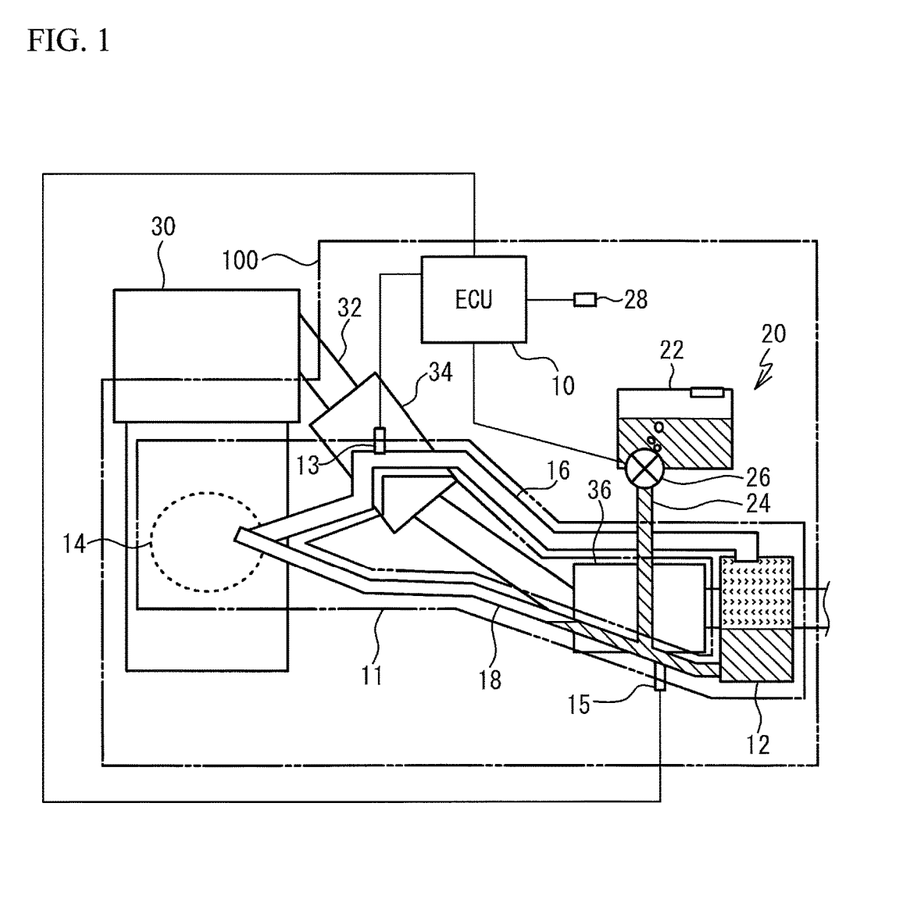
FIG. 1 illustrates a schematic view of an exhaust-heat recovery apparatus in accordance with a first embodiment.

A first embodiment is an example in which a type of abnormality is determined. FIG. 1 illustrates a schematic view of an exhaust-heat recovery apparatus 100 in accordance with a first embodiment. FIG. 1 illustrates an internal combustion engine 30, an exhaust pipe 32, a starter convertor 34 and an under floor convertor 36 together with the exhaust-heat recovery apparatus 100. Each component illustrated in FIG. 1 is mounted on a car. The exhaust-heat recovery apparatus 100 has an ECU (Engine Control Unit) 10, a circulation passage 11 and a heat carrier controller 20. The exhaust-heat recovery apparatus 100 is an evaporation loop structure that performs evaporation with use of received heat and transfers heat with use of heat carrier condensed by heat release.

The circulation passage 11 has a heat recovery unit 12, a condenser 14, a supply pipe 16 and a return pipe 18. The supply pipe 16 and the return pipe 18 are connected to the heat recovery unit 12 (evaporation unit) and the condenser 14. The circulation passage 11 has the heat recovery unit 12 and the condenser 14, and forms a heat carrier passage in which heat carrier circulates. The heat carrier is sealed in the circulation passage 11 in advance under a negative pressure condition that is lower than an atmospheric pressure (for example, −100 kPa). Thereby, a boiling point of the heat carrier is adjusted according to usage circumference when heat is transferred by the heat carrier. For example, $H_2O$ is used as the heat carrier. An amount of the heat carrier in the circulation passage 11 is half or less of a capacity of the circulation passage 11.

The heat recovery unit 12 is a heat exchanger and evaporates the heat carrier. In concrete, the heat recovery unit 12 recovers heat from exhaust gas of the internal combustion engine 30 by performing a thermal exchange between the exhaust gas and the heat carrier and evaporates the heat carrier. The starting of the internal combustion engine 30 is a trigger of a starting operation of the exhaust-heat recovery apparatus 100. The stopping of the internal combustion engine 30 is a trigger of a termination operation of the exhaust-heat recovery apparatus 100. As a result of cooling of the circulation passage 11 after satisfaction of the trigger of the termination operation, condensing of the heat carrier is promoted and atmosphere in the circulation passage 11 becomes vacuum.

The exhaust air of the internal combustion engine 30 is purified by the starter convertor 34 and the under floor convertor 36 that are provided in the exhaust pipe 32, and is exhausted via the exhaust pipe 32. The heat recovery unit 12 is provided on the downstream side in the exhaust pipe 32 with respect to the under floor convertor 36.

The condenser 14 is a portion in which steam acting as the evaporated heat carrier is condensed. The condenser 14 is a portion using the heat transferred by the steam for warming up of the internal combustion engine 30. Therefore, the exhaust-heat recovery apparatus 100 and the internal combustion engine 30 share the condenser 14. The condenser 14 is a portion reducing friction torque of the internal combustion engine 30 during cold with use of the heat transferred by the steam, and is, for example, a bearing portion that bears a crank shaft of the internal combustion engine 30.

The supply pipe 16 supplies steam into the condenser 14 from the heat recovery unit 12. The supply pipe 16 has a pressure sensor 13. The pressure sensor 13 detects a pressure in the circulation passage 11 (hereinafter referred to as an internal pressure) by detecting a pressure in the supply pipe 16. A temperature sensor 15 measures a temperature of the heat carrier in the circulation passage 11.

The return pipe 18 returns the condensed heat carrier to the heat recovery unit 12 from the condenser 14. In concrete, the return pipe 18 is provided so as to return the condensed heat carrier to the heat recovery unit 12 from the condenser 14 with use of a function of gravity together with the heat recovery unit 12.

The heat carrier controller 20 has a reserve tank 22 (reservoir), a branching pipe 24 (branching passage) and a valve 26, and is capable of changing an amount of the heat carrier in the circulation passage 11. The reserve tank 22 reserves the heat carrier in a liquid phase. The reserve tank 22 is a tank opening to atmosphere in which atmospheric pressure has an influence on the reserved heat carrier. An atmospheric sensor 28 measures the atmospheric pressure. The reserve tank 22 has a capacity that is capable of reserving the heat carrier circulating in the circulation passage 11 under a liquid phase condition in addition to the heat carrier reserved under a liquid phase condition. For example, the reserve tank 22 may be a tank having a breather valve suppressing increase of the internal pressure by opening a valve at a predetermined pressure.

The branching pipe 24 is branched from the circulation passage 11 and is connected to the reserve tank 22. The branching pipe 24 is connected to the reserve tank 22 so as to open at a lower position than a height of a liquid level to be secured in the reserve tank 22, and is, for example, connected to a bottom portion of the reserve tank 22 from below. The branching pipe 24 is branched and extends upward from the return pipe 18 in a function direction of the gravity and is branched from the heat recovery unit 12 side in the return pipe 18.

The valve 26 controls a circulation of the heat carrier in the branching pipe 24. In concrete, the valve 26 is a flow amount adjusting valve. The valve 26 may be an opening-closing valve, for example.

The ECU 10 is an electronic control device, and obtains the internal pressure from the pressure sensor 13, a temperature of the heat carrier from the temperature sensor 15 and the atmospheric pressure from the atmospheric pressure sensor 28. The ECU 10 obtains ON/OFF of an ignition of the internal combustion engine 30 and controls opening-closing of the valve 26.

Figure 2A:
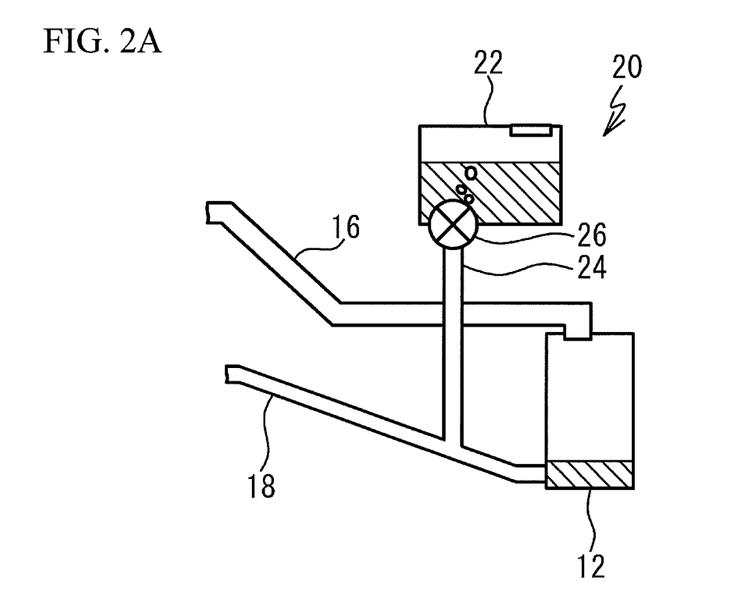
FIG. 2A illustrates a schematic view of heat carrier before starting of engine.
Figure 2B:
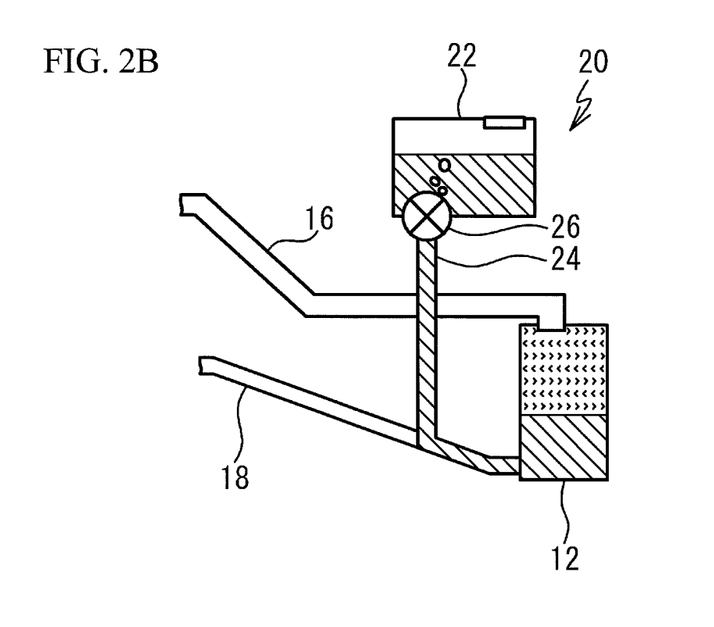
FIG. 2B illustrates a schematic view of heat carrier just after opening of a valve.

FIG. 2A illustrates a schematic view of the heat carrier before the starting of the internal combustion engine 30. FIG. 2B illustrates a schematic view of the heat carrier just after opening of the valve 26.

As illustrated in FIG. 2A, the valve 26 is closed. Therefore, the heat carrier is not supplied toward the return pipe 18 from the heat carrier controller 20. As illustrated in FIG. 2B, when the valve 26 is opened, the heat carrier in a liquid phase reserved in the reserve tank 22 is supplied into the return pipe 18 via the branching pipe 24. Next, a description will be given of an operation of the exhaust-heat recovery apparatus 100.

Figure 3:
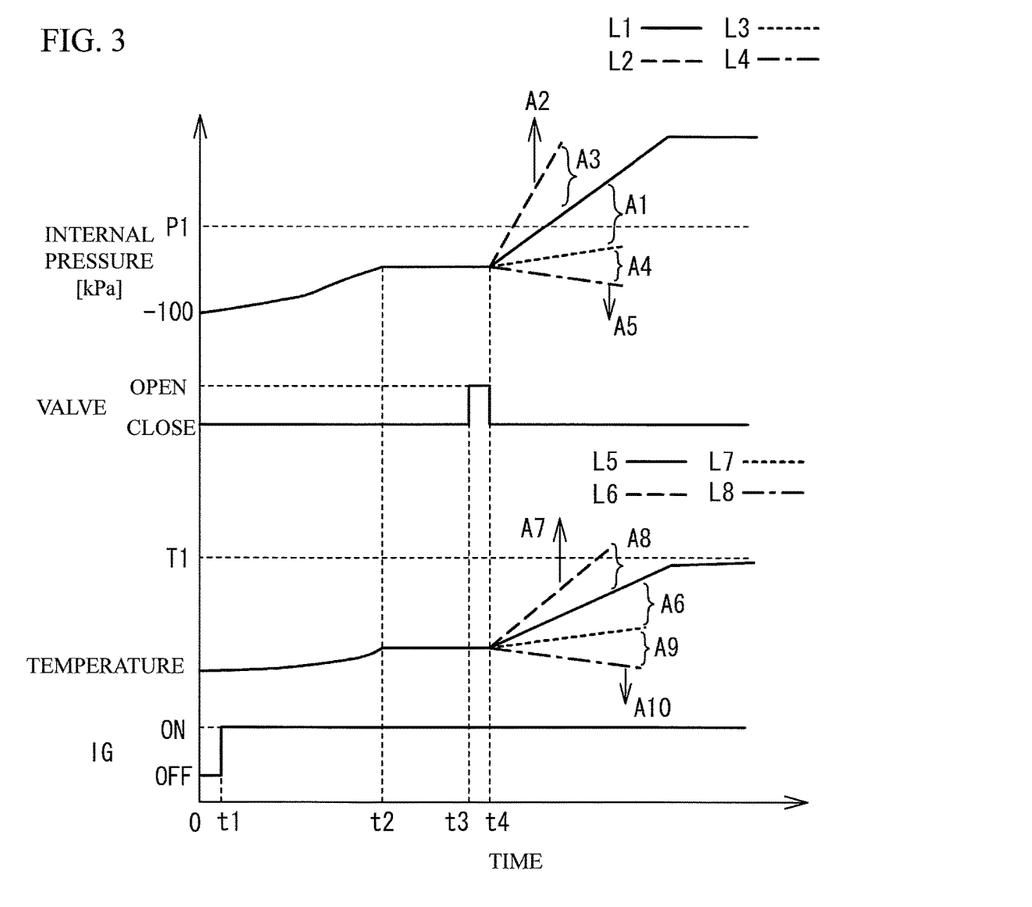
FIG. 3 is timing chart illustrating an operation of an exhaust-heat recovery apparatus.

FIG. 3 is timing chart illustrating the operation of the exhaust-heat recovery apparatus 100. A horizontal axis indicates time. The time passes from zero to t4. A vertical axis indicates the internal pressure, the opening-closing of the valve 26, the temperature of the condenser 14, and the ON/OFF of the ignition (IG in FIG. 3) in order from above. L1 to L4 are lines indicating the internal pressure having a different inclination. L5 to L8 are lines indicating the temperature having a different inclination. Normal/abnormal is determined with use of the inclination of the internal pressure or the inclination of the temperature. A description will be given of a determination based on the internal pressure.

An inclination of a solid line L1 is a1 (first value). An inclination a2 (second value) of a broken line L2 is larger than a1. An inclination a3 (third value) of a dotted line L3 is smaller than a1. An inclination a4 (fourth value) of a dashed line L4 is smaller than a3.

As illustrated in FIG. 3, the ignition is OFF and the valve 26 is closed at a time zero. The internal pressure is a negative pressure lower than the atmospheric pressure P1, and is kept −100 kPa for example. At a time t1, the ignition is ON. The heat carrier circulates in the circulation passage 11. The heat carrier is evaporated in the heat recovery unit 12. Therefore, the internal pressure increases. The steam flows into the circulation passage 11. Therefore, the temperature of the heat carrier in the circulation passage 11 increases. An inclination "a" of the internal pressure (a changing rate of the internal pressure) and an inclination pressure "b" (a changing rate of the temperature) are positive values. The inclination "a" of the internal pressure is small from a time t2 to a time t3, and is such as zero within a predetermined range R1. The range R1 is, for example, a range including zero. And, the internal pressure is smaller than the atmospheric pressure P1 from the time t2 to t3. In this manner, when the condition that the internal pressure is smaller than the atmospheric pressure P1 and the inclination "a" is within the range R1 continues from the time t2 to the time t3, the internal pressure is stable with a negative pressure.

At the time t3, the valve 26 is opened. At the time t4, the valve 26 is closed. As illustrated in FIG. 2B, the reserve tank 22 supplies the heat carrier to the return pipe 18. The ECU 10 determines a portion in which abnormality occurs, based on the inclination "a" of the internal pressure after the time t4.

When the inclination "a" of the internal pressure is less than a1 and is equal to a3 or more, the internal pressure enters the region A1. In this case, the ECU 10 determines that the circulation passage 11 is normal. When the inclination "a" of the internal pressure is a2 or more, the internal pressure enters the region A2. In this case, the ECU 10 determines that the circulation passage 11 is under a dry out condition (hereinafter referred to as dry out). The dry out is a condition in which the heat carrier does not exist in the circulation passage 11.

When the inclination "a" of the internal pressure is less then a2 and is equal to a1 or more, the internal pressure enters the region A3. In this case, the ECU 10 determines that the circulation passage 11 lacks of the heat carrier. The lacking means that an amount of the heat carrier is less than an amount needed for an adequate operation of the exhaust-heat recovery apparatus 100. When the inclination "a" of the internal pressure is less than a3 and is equal to a4 or more, the internal pressure enters the region A4. In this case, the ECU 10 determines the circulation passage 11 is closed. The closing means that the circulation passage 11 is block out by foreign substances or the like. When the inclination "a" of the internal pressure is less than a4, the internal pressure enters the region A5. In this case, the ECU 10 determines that the circulation passage 11 is normal.

Figure 4:
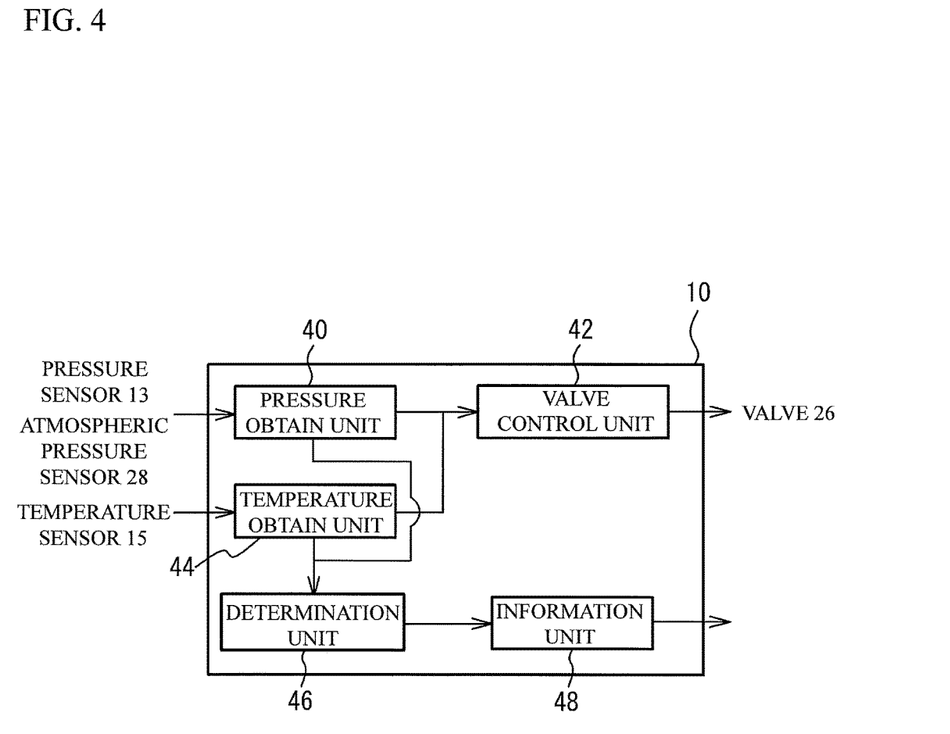
FIG. 4 illustrates a function block diagram of a structure example of an ECU.

FIG. 4 illustrates a function block diagram of a structure example of the ECU 10. As illustrated in FIG. 4, the ECU 10 acts as a pressure obtain unit 40, a valve control unit 42, a temperature obtain unit 44, a determination unit 46 and an information unit 48. The pressure obtain unit 40 obtains the internal pressure from the pressure sensor 13 and obtains the atmospheric pressure P1 from the atmospheric pressure sensor 28. The pressure obtain unit 40 calculates the inclination "a" of the internal pressure based on the obtained internal pressure. The valve control unit 42 controls opening and closing of the valve 26. The temperature obtain unit 44 obtains the temperature of the heat carrier in the circulation passage 11 that is measured by the temperature sensor 15. The determination unit 46 determines a portion in which abnormality occurs, based on the inclination "a" of the internal pressure as illustrated in FIG. 3. The information unit 48 informs the portion in which the abnormality occurs to a user of a car.

Figure 5:
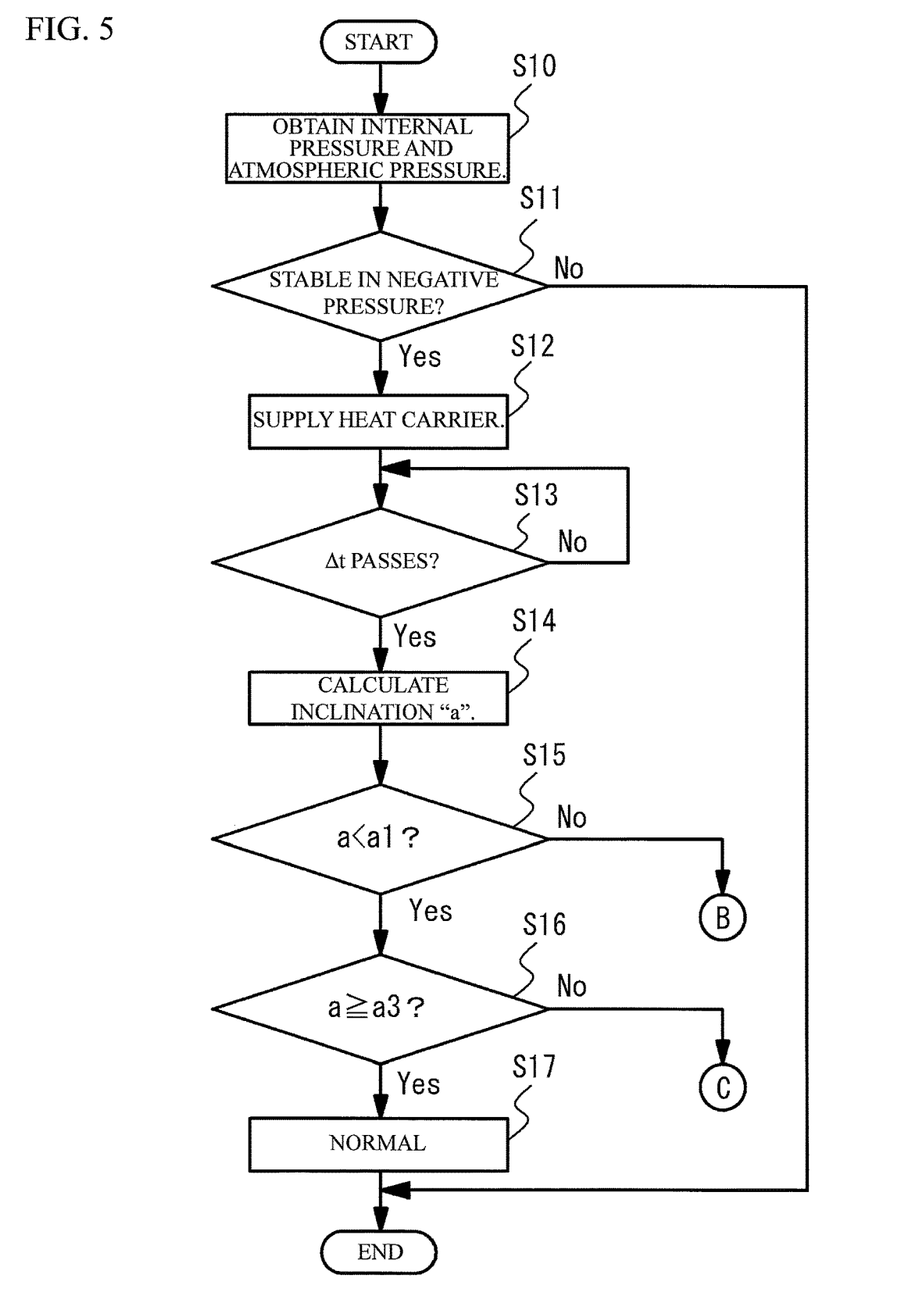
FIG. 5 illustrates a flowchart of a control example of the exhaust-heat recovery apparatus.
Figure 6A:
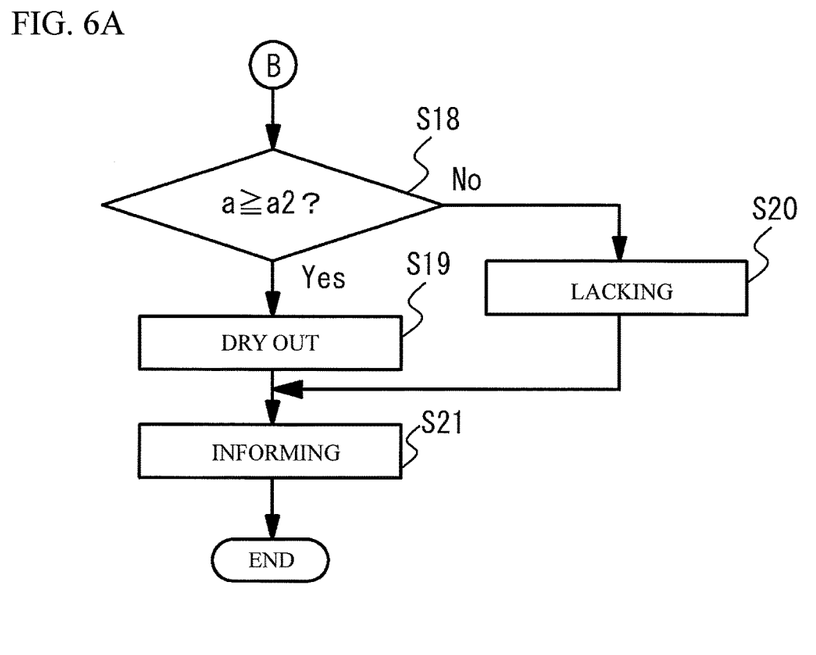
FIG. 6A and FIG. 6B illustrate a flowchart of a control example of an exhaust-heat recovery apparatus.
Figure 6B:
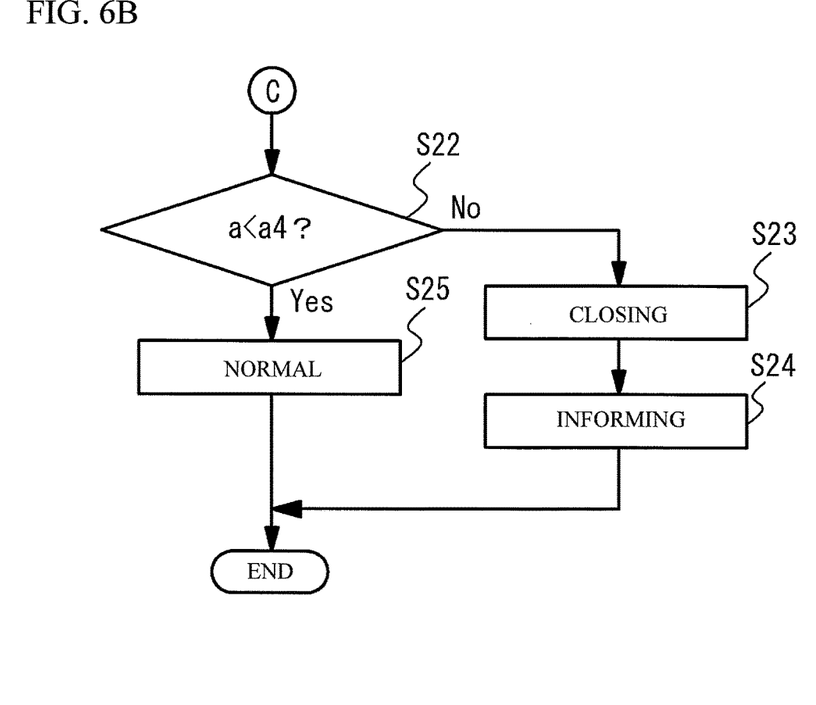

FIG. 5 to FIG. 6B illustrate a flowchart of a control example of the exhaust-heat recovery apparatus 100. As illustrated in FIG. 5, the pressure obtain unit 40 obtains the internal pressure and the atmospheric pressure (Step S10). The valve control unit 42 determines whether the internal pressure is stable with negative pressure (Step S11). That is, it is determined whether the internal pressure is smaller than the atmospheric pressure P1 and the inclination "a" is within the range R1. When it is determined as "No", the control is terminated. A case where it is determined as "Yes" corresponds to the time t2 to the time t3 of FIG. 3. The valve control unit 42 opens the valve 26. Thus, the heat carrier is supplied to the return pipe 18 (Step S12). The Step S12 corresponds to the time t3 to the time t4 of FIG. 3. The pressure obtain unit 40 determines whether a predetermined time Δt passes from the time t4 (Step S13). When it is determined as "No", the Step S13 is repeated. When it is determined as "Yes", the pressure obtain unit 40 calculates the inclination "a" of the internal pressure (Step S14).

The determination unit 46 determines whether the inclination "a" is less than the inclination a1 (Step S15). A case where it is determined as "No" will be described later. When it is determined as "Yes", the determination unit 46 determines whether the inclination "a" is equal to the inclination a3 or more (Step S16). A case where it is determined as "No" will be described later. When it is determines as "Yes", the determination unit 46 determines that the circulation passage 11 is normal (Step S17). This corresponds to the region A1 of FIG. 3. After the Step S17, the control is terminated.

When it is determined as "No" in the Step S15, the determination unit 46 determines whether the inclination "a" is equal to a2 or more (Step S18, with reference to FIG. 5 and B of FIG. 6A). When it is determined as "Yes", the determination unit 46 determines that the dry out occurs (Step S19). This corresponds to the region A2 of FIG. 3. When it is determined as "No", the determination unit 46 determines that the heat carrier is lacking (Step S20). This corresponds to the region A3 of FIG. 3. After the Step S19 and the Step S20, the information unit 48 performs informing (Step S21). After the step S21, the control is terminated.

When it is determined as "No" in the Step S16, the determination unit 46 determines whether the inclination "a" is less than a4 (Step S22, with reference to FIG. 5 and C of FIG. 6B). When it is determined as "No", the determination unit 46 determines that closing occurs (Step S23). This corresponds to the region A4 of FIG. 3. After the Step S23, the information unit 48 performs informing (Step S24). When it is determined as "Yes" in the Step S22, the determination unit 46 determines that the circulation passage 11 is normal (Step S25). This corresponds to the region A5 of FIG. 3. After the Step S24 or the Step S25, the control is terminated.

In a passive control, either when a warming-up is terminated and the internal pressure becomes a steady-state value or when opening and closing of a valve for adjusting a flow amount of heat carrier is switched, a determination is performed. Therefore, it is difficult to increase a frequency of the determination. And, the internal pressure and an inclination of the internal pressure change greatly according to an operation condition or an operation history of the engine. Therefore, it is difficult to decide a threshold for the determination. It is difficult to determine normal/abnormal.

In the first embodiment, when the inclination "a" of the internal pressure is within the range R1, the heat carrier controller 20 supplies the heat carrier. The determination unit 46 determines normal/abnormal based on the inclination "a" of the internal pressure after supplying. That is, during the normal operation of which internal pressure is stable, an active control in which the exhaust-heat recovery apparatus 100 performs an operation for an active determination is performed. Therefore, the frequency of the determination can be increased, and the abnormality can be detected early. For example, when the internal pressure is stable, the determination of normal/abnormal may be always performed. The thresholds (a1 to a4) can be set easily and the accuracy of the determination of normal/abnormal can be improved, because the determination unit 46 performs the determination in the stable condition.

The first embodiment may lack of a valve to adjust the flow amount of the heat carrier in the circulation passage 11. Therefore, the structure of the exhaust-heat recovery apparatus 100 can be simplified. The amount of the heat carrier in the circulation passage 11 is, for example, approximately a half of the capacity. Accordingly, when the heat carrier controller 20 supplies a little amount of the heat carrier that is, for example, approximately one-tenth of the capacity, the inclination of the internal pressure can be changed. The supply amount may be changed according to the internal pressure and the operation condition of the exhaust-heat recovery apparatus 100, and may be an amount with which the changing of the internal pressure can be detected.

In accordance with the inclination "a", the determination unit 46 determines a type of abnormality such as the dry out, lacking of the heat carrier, or closing. Therefore, a user can do with the abnormality adequately and speedily. And, when the heat carrier is lacking or the dry out is occurring (Steps S19 or S20), the valve control unit 42 may automatically open the valve 26. Thus, the heat carrier is supplied by the heat recovery unit 12, and the lacking of the heat carrier or the dry out may be solved.

The informing means of the information unit 48 is such as turning on of an informing lamp provided in a car room or displaying of a massage on a liquid crystal monitor. In accordance with the type of the abnormality, colors of the informing lamp, a subject matter of the message may be changed. The times (t2 to t3) may be arbitrarily determined. The inclinations a1 to a4 may be arbitrarily determined according to a usage environment of a car, the capacity of the circulation passage 11 and so on.

As illustrated in the Step S13 of FIG. 5, the determination unit 46 may perform the determination based on the inclination "a" after the time Δt passes after the supplying of the heat carrier. Thus, the changing of the internal pressure after the heat carrier supplied in the Step S12 reaches the heat recovery unit 12 is reflected to the inclination "a". Therefore, the accuracy of the determination is improved. A Δt is decided based on the internal pressure, the atmospheric pressure P1 and the capacity of the circulation passage 11 or the like. The determination unit 46 may perform the determination based on the inclination "a" just after the supplying of the heat carrier without the Step S14.

For example, only the inclination "a1" may be used as the threshold. That is, the determination unit 46 may determine as normal when the inclination "a" after the time t3 is less than a1 and may determine as abnormal when the inclination "a" is equal to "a1" or more. In this manner, the threshold can be selected.

The temperature of the heat carrier in the circulation passage 11 may be used as an index of the determination, except for the internal pressure. As illustrated in FIG. 3, for the time t2 to t3, the temperature is stable. That is, the temperature is lower than the boiling point T1 of the heat carrier, and the inclination "b" of the temperature is within a predetermined range. In this case, the heat carrier controller 20 supplies the heat carrier. The determination unit 46 performs the determination based on the inclination "b" of the temperature after supplying. An inclination of the solid line L5 is b1 (first value). An inclination b2 (second value) of the broken line L6 is larger than b1. An inclination b3 (third value) of the dotted line L7 is smaller than b1. An inclination b4 (fourth value) of the dashed line L8 is smaller than b3. The region A6 between L5 and L7 corresponds to the region A1. The region A7 above the L6 corresponds to the region A2. The region A8 between L5 and L6 corresponds to the region A3. The region A9 between L7 and L8 corresponds to the region A4. The region A10 below L8 corresponds to the region A5.

[Second Embodiment]

Figure 7:
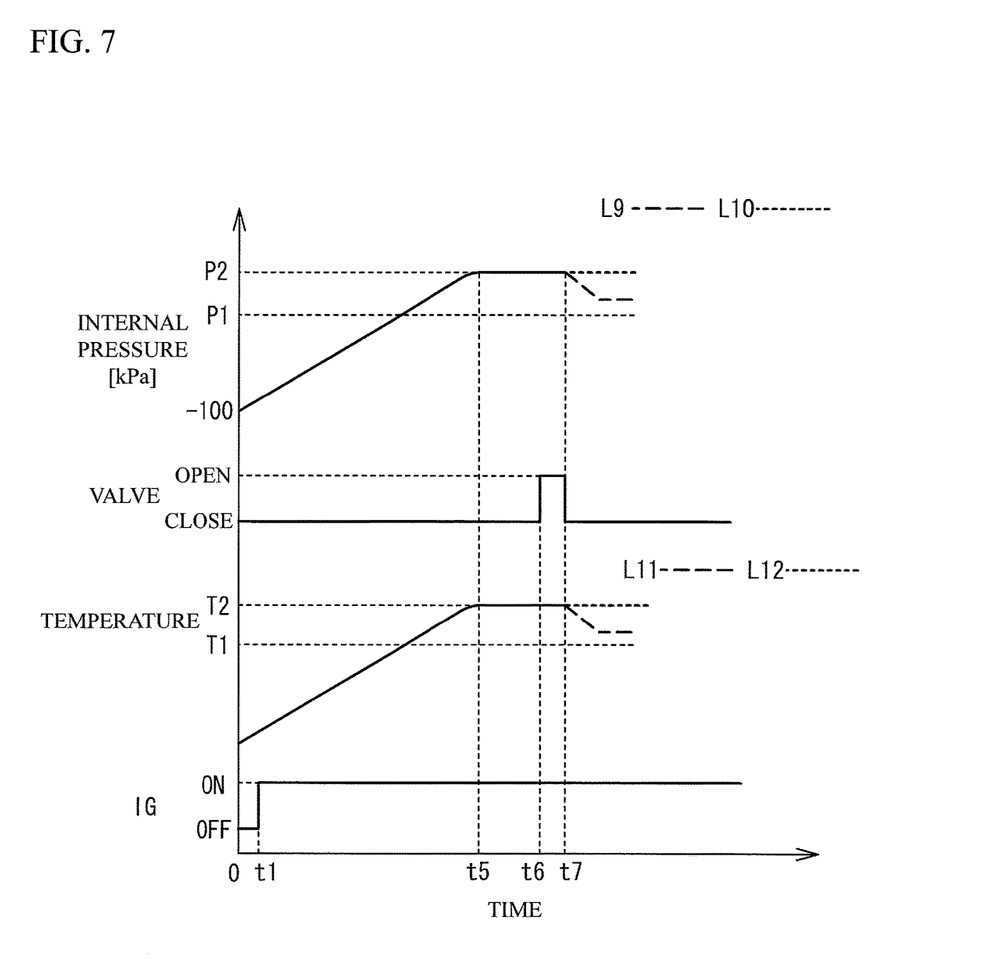
FIG. 7 illustrates a timing chart showing an operation of an exhaust-heat recovery apparatus.

A second embodiment is an example of the determination in a case where the internal pressure is high. The exhaust-heat recovery apparatus 100 of the second embodiment is also common. FIG. 7 illustrates a timing chart showing the operation of the exhaust-heat recovery apparatus 100.

As illustrated in FIG. 7, for the time t5 to t6, the internal pressure is P2. The inclination "a" of the internal pressure is within the predetermined range R2 (second range). The range R2 is a range including zero, and may be the same as the range R1 or may be different from the range R1. P2 is a positive pressure higher than the atmospheric pressure P1. In this manner, when the condition that the internal pressure is higher than the atmospheric pressure P1 and the inclination "a" is within the range R2 continues for a predetermined time (time t5 to t6), the internal pressure is stable with a positive pressure. The valve 26 opens at the time t6 and closes at the time t7.

In a case where the abnormality does not occur, the heat carrier in a liquid phase is recovered to the reserve tank 22 from the return pipe 18 under a normal condition when the valve 26 opens. When the amount of the heat carrier in the circulation passage 11 is reduced, the internal pressure is reduced. Therefore, when the internal pressure is reduced after the time t5 as indicated by the broken line L9, the ECU 10 determines as normal. When the internal pressure hardly changes as indicated by the dotted line L10, it is estimated that the heat carrier does not flow into the reserve tank 22. The circulation passage 11 is possibly closed. And, a plenty of the heat carrier possibly flows into the circulation passage 11. That is, internal pressure hardly changes even if the heat carrier flows into the reserve tank 22, because the amount of the heat carrier is excessive. The ECU 10 determines that the abnormality such as the closing or the excessive heat carrier occurs.

Figure 8:
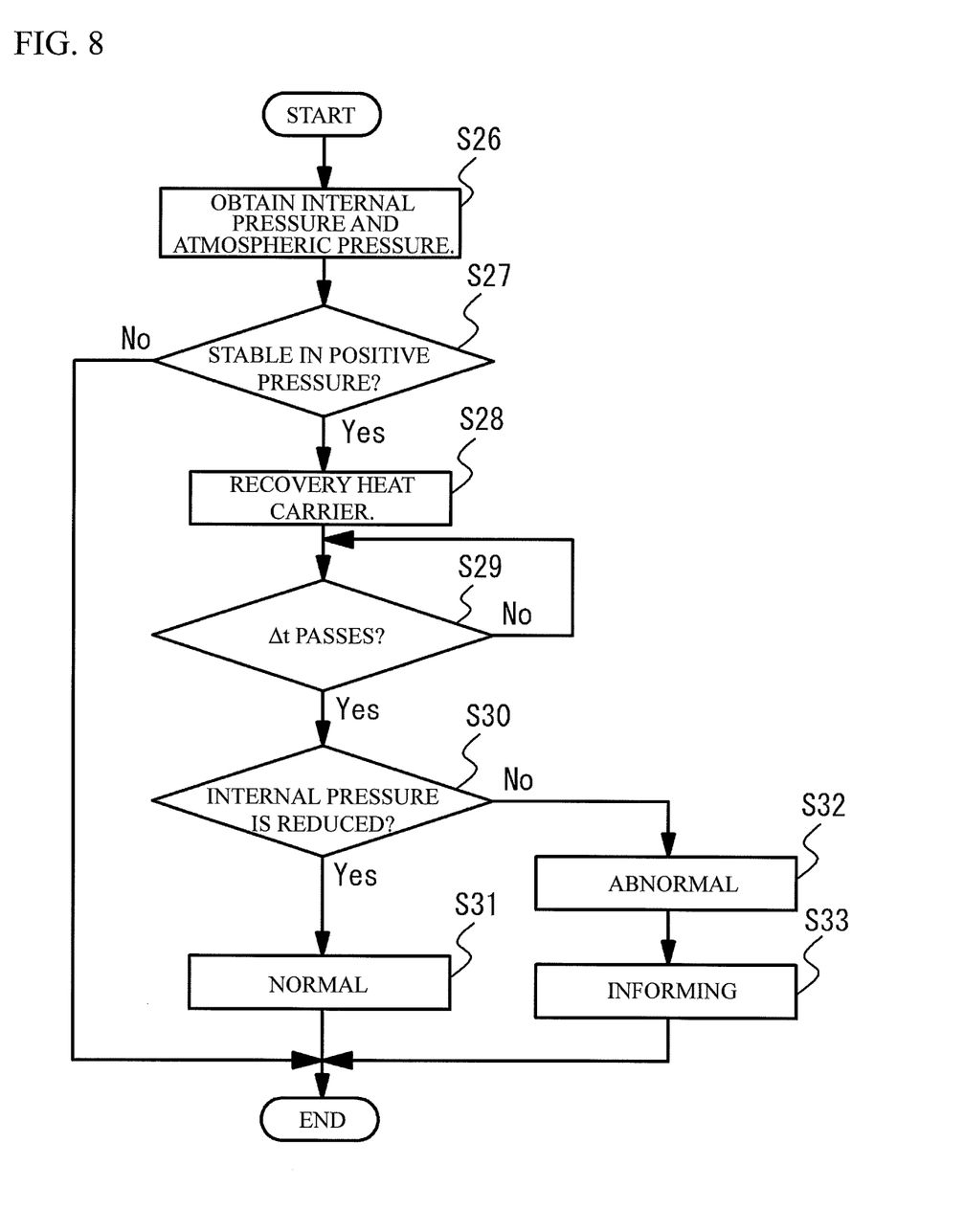
FIG. 8 is a flowchart illustrating a control of an exhaust-heat recovery apparatus.

FIG. 8 is a flowchart illustrating the control of the exhaust-heat recovery apparatus. The pressure obtain unit 40 obtains the internal pressure and the atmospheric pressure P1 (Step S26). The valve control unit 42 determines whether the internal pressure is stable with a positive pressure (Step S27). When it is determined as "No", the control is terminated. When it is determined as "Yes", the valve control unit 42 opens or closes the valve 26. Thus, the heat carrier is recovered (Step S28). This corresponds to the time t5 or t6 of FIG. 6. The Step S29 is the same as the Step S13 of FIG. 5. After the Step S29, the determination unit 46 determines whether the internal pressure is reduced (Step S30). When it is determined as "Yes", the determination unit 46 determines that the circulation passage 11 is normal (Step S31). This corresponds to the broken line L9 of FIG. 7. After the Step S31, the control is terminated.

When it is determined as "No" in the Step S30, the determination unit 46 determines that abnormality occurs in the circulation passage 11 (Step S32, the dotted line L10 of FIG. 6). The abnormality is occurring of the closing or excessiveness of the heat carrier in the circulation passage 11. The information unit 48 performs informing (Step S33). After the Step S33, the control is terminated.

In the second embodiment, when the internal pressure is positive, the determination of normal/abnormal can be achieved. And, for example, the type of the abnormality such as the closing or the excessiveness of the heat carrier can be estimated. Therefore, speedy and adequate handling of the abnormality can be achieved. When the amount of the heat carrier is excessive, it takes long time to boil the heat carrier. Therefore, the responsibility of the exhaust-heat recovery apparatus 100 is degraded. And, the circulation passage 11 may be closed or damaged because of freezing of the heat carrier. In the second embodiment, the excessiveness of the heat carrier can be speedily detected. Therefore, handling of the excessiveness of the heat carrier can be achieved before the freezing of the heat carrier.

In the second embodiment, the determination may be performed with use of the temperature of the heat carrier in the circulation passage 11. When the temperature is a temperature T2 that is higher than the boiling point T1 of the heat carrier and the inclination "b" is within a predetermined range as illustrated in FIG. 7, that is, the temperature is stable at higher value than the boiling point T1, the heat carrier controller 20 supplies the heat carrier. When the temperature is reduced after the supplying as indicated by the broken line L11 of FIG. 7, the determination unit 46 determines that the circulation passage 11 is normal. When the temperature is not reduced as indicated by the dotted line L12, the determination unit 46 determines that abnormality of the closing or the excessiveness of the heat carrier occurs.

As mentioned above, in the first embodiment, when the internal pressure is negative, the determination of normal/abnormal can be achieved. Therefore, when the first embodiment and the second embodiment are combined, the determination unit 46 can determine normal/abnormal even if the internal pressure is any of negative and positive. It is therefore possible to monitor and correct the exhaust-heat recovery apparatus 100 effectively. For example, zero other than the range R1 and the range R2 can be used as a threshold for determining the type of abnormality. And, in the first embodiment and the second embodiment, normal/abnormal may be determined with use of both the internal pressure and the temperature. The amount of the heat carrier in the evaporation loop structure is less than that of a Rankine cycle. Therefore, the changing of the internal pressure and the changing of the temperature caused by the supplying or recovering of the heat carrier can be easily detected. It is therefore possible to determine normal/abnormal with higher accuracy. However, the first embodiment and the second embodiment can be applied to a heat pipe or a Rankine cycle other than the evaporation loop structure.

The embodiments of the present invention are described. However, the present invention is not limited to the specifically disclosed embodiments and variations but may include other embodiments and variations without departing from the scope of the present invention.

DESCRIPTION OF LETTERS OR NUMERALS

ECU 10
Circulation passage 11
Heat recovery unit 12
Condenser 14
Heat carrier controller 20
Reserve tank 22
Branching pipe 24
Valve 26
Pressure obtain unit 40
Valve control unit 42
Temperature obtain unit 44
Determination unit 46
Exhaust-heat recovery apparatus 100

The invention claimed is:

1. An exhaust-heat recovery apparatus comprising:
a heat carrier passage, through which a heat carrier circulates, that has an evaporation unit evaporating the heat carrier and a condenser condensing the evaporated heat carrier, and the heat carrier is depressurized below atmospheric pressure in the heat carrier passage so that an internal pressure is a negative pressure lower than the atmospheric pressure in the heat carrier passage, and after circulating the heat carrier in the heat carrier passage and evaporating the heat carrier by the evaporation unit, the internal pressure becomes higher than the negative pressure as time goes on;

a heat carrier controller that changes an amount of the heat carrier in the heat carrier passage and supplies the heat carrier from a tank or recovers the heat carrier to the tank when the internal pressure is lower than the atmospheric pressure and a changing rate of the internal pressure in the heat carrier passage or a changing rate of a temperature of the heat carrier in the heat carrier passage is within a predetermined range; and a determination unit that determines whether the heat carrier passage is abnormal based on the changing rate of the internal pressure or the changing rate of the temperature after the supplying of the heat carrier from the tank or the recovering of the heat carrier from the tank, wherein the heat carrier is evaporated in the evaporating unit by a thermal exchange between an exhaust gas of an engine and the heat carrier and the evaporated heat carrier is condensed in the condenser by the thermal exchange between the evaporated heat carrier and the exhaust gas of the engine; and the heat carrier controller includes a reserve tank to store heat carrier; and wherein the reserve tank includes an outlet valve to change the amount of the heat carrier in the heat carrier passage.

2. The exhaust-heat recovery apparatus as claimed in claim 1, wherein:

the heat carrier controller supplies the heat carrier in the liquid phase into the heat carrier passage either when the internal pressure is equal to a pressure applied to the heat carrier in the liquid phase in the reservoir or less and the changing rate of the internal pressure is within the predetermined range or when the temperature is equal to a boiling point of the heat carrier or less and the changing rate of the temperature is within the predetermined value; and the determination unit determines whether the heat carrier passage is abnormal based on the changing rate of the internal pressure or the changing rate of the temperature after the supplying of the heat carrier.

3. The exhaust-heat recovery apparatus as claimed in claim 2, wherein:

the determination unit determines that the heat carrier passage is normal when the changing rate of the internal pressure or the changing rate of the temperature after the supplying of the heat carrier is less than a first value; and the determination unit determines that the heat carrier passage is abnormal when the changing rate of the internal pressure or the changing rate of the temperature after the supplying of the heat carrier is equal to or more than the first value.

4. The exhaust-heat recovery apparatus as claimed in claim 3, wherein:

the determination unit determines that the heat carrier does not exist in the heat carrier passage when the changing rate of the internal pressure or the changing rate of the temperature after the supplying of the heat carrier is equal to or more than a second value that is larger than the first value; and the determination unit determines that the heat carrier passage lacks of the heat carrier when the changing rate of the internal pressure or the changing rate of the temperature after the supplying of the heat carrier is less than the second value and is equal to or more than the first value.

5. The exhaust-heat recovery apparatus as claimed in claim 2, wherein:

the determination unit determines that the heat carrier passage is abnormal when the changing rate of the internal pressure or the changing rate of the temperature after the supplying of the heat carrier is equal to or more than a first value;

the determination unit determines that the heat carrier passage is normal when the changing rate of the internal pressure or the changing rate of the temperature after the supplying of the heat carrier is less than the first value and is equal to or more than a third value that is smaller than the first value; and the determination unit determines that the heat carrier passage is closed when the changing rate of the internal pressure or the changing rate of the temperature after the supplying of the heat carrier is less than the third value.

6. The exhaust-heat recovery apparatus as claimed in claim 2, wherein:

the determination unit determines that the heat carrier passage is abnormal when the changing rate of the internal pressure or the changing rate of the temperature after the supplying of the heat carrier is equal to or more than a first value;

the determination unit determines that the heat carrier passage is normal when the changing rate of the internal pressure or the changing rate of the temperature after the supplying of the heat carrier is less than the first value and is equal to or more than a third value that is smaller than the first value;

the determination unit determines that the heat carrier passage is normal when the changing rate of the internal pressure or the changing rate of the temperature after the supplying of the heat carrier is less than a fourth value that is smaller than the third value; and the determination unit determines that the heat carrier passage is closed when the changing rate of the internal pressure or the changing rate of the temperature after the supplying of the heat carrier is less than the third value and is equal to or more than the fourth value.

7. The exhaust-heat recovery apparatus as claimed in claim 1, wherein:

the heat carrier controller recovers the heat carrier from the heat carrier passage either when the internal pressure is larger than a pressure applied to the heat carrier in the liquid phase in the reservoir and the changing rate of the internal pressure is within a predetermined range or when the temperature is higher than a boiling point of the heat carrier and the changing rate of the temperature is within a predetermined range;

the determination unit determines that the heat carrier passage is normal when the internal pressure or the temperature is reduced after the recovering of the heat carrier; and the determination unit determines that the heat carrier passage is closed or an amount of the heat carrier is excessive when the internal pressure or the temperature is not reduced after the recovering of the heat carrier.

* * * * *